May 18, 1954  E. T. ADAMS  2,678,802
SEAT RING MEANS FOR PORTWAYS OF GATE VALVES OR THE LIKE
Filed Dec. 22, 1950  2 Sheets-Sheet 1
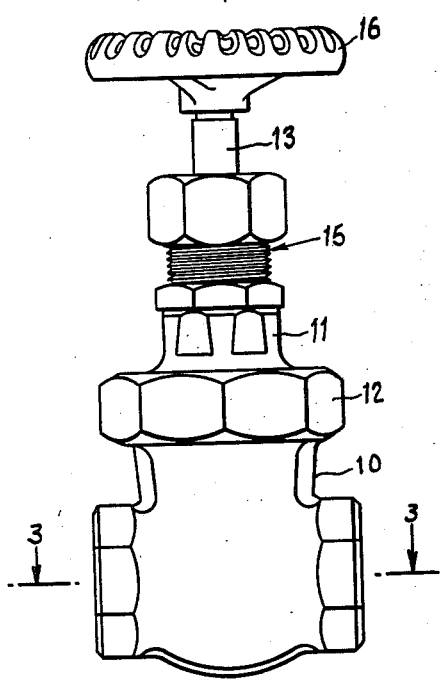
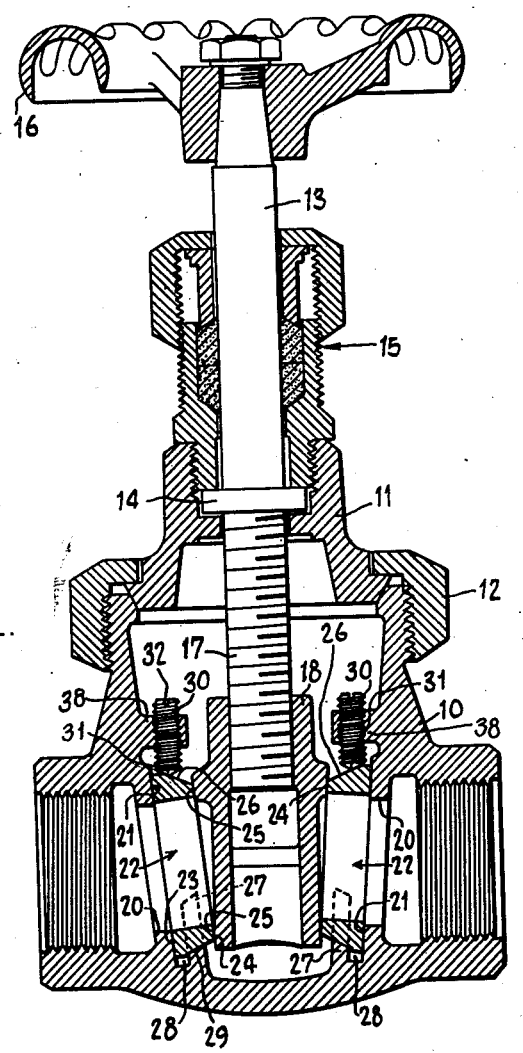
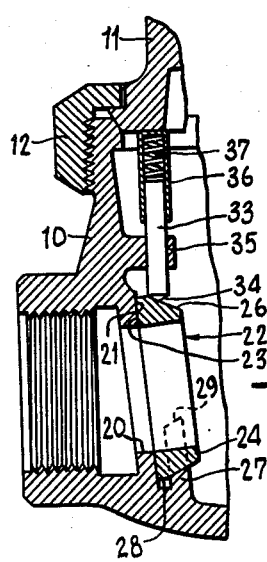
INVENTOR.
EDWARD THAYER ADAMS
BY
Kenyon & Kenyon
HIS ATTORNEYS May 18, 1954 E. T. ADAMS 2,678,802
SEAT RING MEANS FOR PORTWAYS OF GATE VALVES OR THE LIKE
Filed Dec. 22, 1950 2 Sheets-Sheet 2
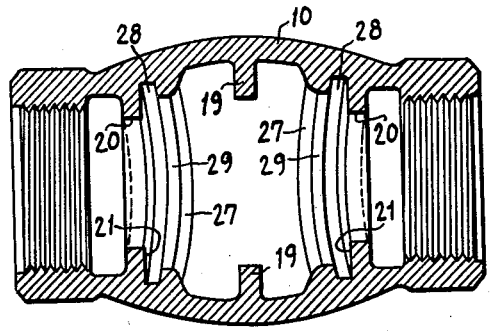
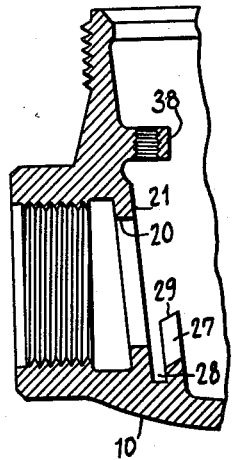
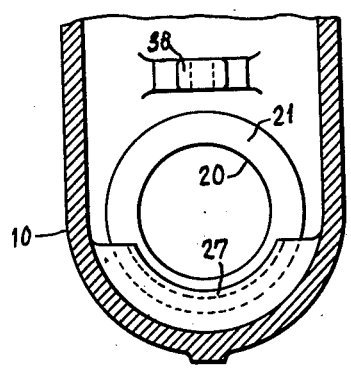
INVENTOR.
EDWARD THAYER ADAMS
BY
Kenyon & Kenyon
HIS ATTORNEYS Patented May 18, 1954

2,678,802

UNITED STATES PATENT OFFICE 2,678,802

SEAT RING MEANS FOR PORTWAYS OF GATE VALVES OR THE LIKE

Edward Thayer Adams, Johnson City, N. Y., assignor to The Fairbanks Company, New York, N. Y., a corporation of New Jersey Application December 22, 1950, Serial No. 202,307

9 Claims. (Cl. 251—328)

This invention relates to improvements in seat ring means for a portway in a gate valve or the like and relates especially to improved holding means for providing a readily removable seat ring.

In apparatus such a gate valve passage of a fluid between the opposite sides of the valve can be controlled by the movement of a gate or the like relative to a sealing surface provided at the terminus of a portway. In the course of normal operation the sealing surface against which the gate is adapted to be closed becomes gradually worn or corroded or both and requires replacement. In order that the sealing surface may be replaced without replacing the entire valve it has heretofore been proposed to provide the sealing surface so that it is carried by a removable seat ring. A simple arrangement for providing a removable seat ring is to provide the seat ring with an externally threaded portion in back of the forward sealing surface and adapted for threaded engagement with internal threading adjacent the mouth of the portway so that the seat ring may be connected or removed by rotation thereof relative to the portway. Gate valves provided with removable seat rings of this type still are quite commonly employed. However, a removable seat ring of this type has decided disadvantages. In the first place removal and replacement of the seat ring generally requires removal of the entire valve from the line in which it is located so as to permit the necessary operations to be carried out. Likewise after the valve has been in use for a considerable period of time the seat ring is likely to become frozen in place so that it cannot be removed or can be removed only with extreme difficulty. At best the replacement of seat rings of this type is very difficult and inconvenient.

In order to overcome the difficulties and disadvantages incident to the use of threaded seat rings there have been a number of proposals for enabling more ready removal and replacement of a removable seat ring for the portway of a gate valve or the like. However, such proposals while permitting more ready removal and replacement of a seat ring have had other disadvantages and drawbacks. In the case of some such proposals the means employed is complicated and requires extremely accurate machining of the parts, with the result that the valve as a whole is so excessively costly as to be impractical commercially. Other difficulties result from failure to hold the seat ring securely in place with the result that fine particles of sediment or the like get between the seat ring and the portway to such extent as to permit leakage. Moreover, while in certain proposed constructions the seat ring may be held securely in position when the valve is new, gradual wearing away or erosion of parts is attended with gradual loosening of the seat ring and consequent leakage, and the construction is such that when this occurs there is no means for compensating for the wearing away of the surfaces with the result that even though a new seat ring may be substituted for an old one it cannot be held in pressure tight relation with the portway and the entire valve has to be discarded. Another difficulty that has been encountered results from the fact that any particles of sediment or the like that may become casually carried by one or more of the parts during the replacement of a seat ring tends to interfere with the obtainment of a fluid tight seal. Moreover, the structures of some such proposals, while avoiding the employment of threading, are of such character that the replacement of the seat ring cannot be effective without removal of the valve from the line in which it is located.

It is an object of this invention to provide a portway and removable seat ring combination that is free of difficulties and disadvantages such as those mentioned above and that at the same time is simple and inexpensive to produce and is long lasting in service.

It is a feature and advantage of this invention that the means for removably holding the seat ring is such that a worn or defective seat ring can be quickly and easily replaced with ordinary tools and without removing the valve body from the line in which it is located.

It is a further feature and advantage of this invention that the holding means is such that the seat ring can be readily installed in pressure tight contact with the portway with which it is used.

Another feature and advantage of this invention resides in the fact that positive alignment of the seat ring with the portway is obtained without resort to expedients such as threads, taper fitting, lugs or the like for insuring portway alignment.

A further feature and advantage of this invention resides in the fact that the holding means is such that particles of sediment or the like which may be encountered during a replacement operation tend to become lodged in a recess or channel wherein they are harmlessly out of the way and do not interfere with the attainment of a pressure tight seal between the seat ring and the seal surface of the portway.

A further feature and advantage of this invention resides in the fact that the holding means for the seat ring is such that notwithstanding wearing away in use of contacting surfaces the disposition of the seat ring can be accommodated thereto in pressure tight relationship thus greatly prolonging the useful life of the valve.

A further feature and advantage of this invention resides in the fact that while the seat ring is very simple and easily made, and while the holding means is simple and easily operable to permit ready removal of the seat ring, the seat ring is very securely maintained in pressure sealed relation with respect to the portway.

The foregoing and other features and advantages have been realized according to this invention by the novel combination of structural elements described and illustrated hereinbelow which are preferably all employed in combination although certain thereof only may be availed of so as to obtain some of the benefits and advantages of this invention. Thus certain aspects of this invention relate to lip means that cooperates with the periphery of the seat ring for providing holding means whereby wearing away of contacting surfaces is permitted and whereby a channel of substantial width and depth is provided which not only permits such wearing away of contacting surfaces but also provides a recess in which solid particles may become disposed without interfering with the seal between the contacting surfaces where a fluid tight seal is to be provided. Other elements relate to the holding means that permits removal of the seat ring and that cooperates with the lip means whereby the seat ring may be held tightly in place in the desired sealed relation with the portway and which is of such character as to accommodate itself to differences in the relative positions of the parts occasioned by wearing away of contacting surfaces. Other elements relate to the means whereby parts coact to afford the desired sealed relation while permitting ready removal of the seat ring.

The foregoing and other purposes, features and advantages of this invention will become apparent from the following description of typical embodiments of this invention as illustrated for exemplary purposes in connection with a gate valve construction, such description being in connection with the accompanying drawings, wherein Fig. 1 is a side elevation of an exemplary gate valve with which the present invention may be employed;

Fig. 2 is a side elevation of the gate valve shown in Fig. 1, the showing being principally in section through the center thereof in order to illustrate the present invention as embodied therein;

Fig. 3 is a sectional plan view of the gate valve shown in Fig. 1 taken on the line 3—3 of Fig. 1 with certain of the parts removed;

Fig. 4 is a fragmentary sectional view corresponding with the section of Fig. 2 but with certain of the parts removed for purposes of clarification;

Fig. 5 is a fragmentary sectional view of parts shown in Fig. 4 looking toward the portway shown in Fig. 4, and Fig. 6 is a fragmentary sectional view similar to Fig. 4 with the seat ring in place and showing a modification.

Referring to Figs. 1 to 5, this invention has been illustrated as embodied in a gate valve. The gate valve as shown comprises a valve body 10 provided with a bonnet 11 which is secured to the valve body 10 by the flanged collar 12. The valve stem 13 having the annular flange 14 is rotatably mounted with reference to the bonnet 11 and any suitable type of packing and packing housing arrangement such as that which is indicated generally by the reference character 15 and which is carried by the bonnet 11. The upper end of the stem 13 is provided with a handle 16 and the lower threaded end 17 of the stem 13 carries the gate 18 in threaded relation thereto so that upon rotation of the stem in one direction or the other the gate may be raised and lowered relative to the valve body and to the portways therein for opening or closing the passage between the portways. The movement of the gate may be appropriately guided as by the flanges 19 that are integral with the valve body 10 and that cooperate with grooves (not shown) in the edges of the gate 18.

Gate valve construction such as that described above is conventional and it is to be understood that the particular construction as described and shown in the drawings is merely illustrative and that any other type of construction for a gate valve may be employed.

A typical removable seat ring and portway combination embodied in this invention is shown in Figs. 2, 3, 4 and 5 as incorporated in the gate valve above described, and the following description is applicable to the left hand seat ring and portway combination shown in Figs. 2 and 3, certain details thereof being shown in Figs. 4 and 5.

The valve body 10 has the portway 20 therein which presents the annular terminal seal surface 21. The seat ring is indicated generally by the reference character 22 and has an annular back seal surface 23 that abuts the terminal seal surface 21 presented by the portway 20 in substantial registration therewith. The seat ring 22 also has the annular front seal surface 24 which is adapted for registration with the seal surface 25 presented by the gate 18 when the gate 18 is in the position shown in Fig. 2 so as to provide a fluid tight seal between the seat ring 22 and the gate 18. The seat ring 22 also has the tapered peripheral surface 26 which in the embodiment shown is frusto conical so that the surface 26 tapers inwardly extending forwardly from adjacent the annular back seal surface 23 of the seat ring.

The lower portion of the seat ring is supported and held in position by the lip member 27 which is in rigid relation to the portway 20 as by being an integral portion of the valve body 10 in the embodiment shown. The lip member 27 is of substantial height and is substantially spaced from the annular terminal seal surface 21 presented by the portway so as to provide a channel 28 of substantial width and of substantial depth between the lip member 27 and the annular seal surface 21 presented by the portway. The lip member 27 is provided with an inner surface 29 that contacts the tapered annular surface 26 of the seat ring throughout a substantial portion of the angular radial extent of the tapered annular surface 26 of the seat ring, the surface 29 being tapered so as to be in alignment with the tapered annular surface 26 of the seat ring.

By the construction as thus far described it is apparent that if the tapered annular surface 26 of the seat ring 22 is forced against the surface 29 of the lip member 27, the annular back seal surface 23 of the seat ring will be forced against the annular terminal seal surface 21 of the portway 20. Further in this connection it is one of the features and advantages of this invention that the surface of the lip member in contact with the peripheral surface of the seat ring is substantially above the base of the lip member 27 so that upon gradual wearing away of the surface of the lip member or of the seat ring, as by frictional wear or erosion, the seat ring is so supported that it can accommodate itself to such wear by lateral shifting of the seat ring relative to the portway in an amount corresponding to the extent of the wear. Because of this feature the construction has very long life notwithstanding wear between the contacting parts. Further in this connection it may be pointed out that even though a worn seat ring may be replaced by a new one, the new seat ring will not be held in properly sealed relation to the other parts if the seat ring and the holding means therefor are not of such character as to permit accommodation to gradual wearing away of the parts to be maintained in pressure contact relation. The improved construction above described successfully overcomes this difficulty.

Another feature and advantage of the construction shown is that the width and depth of the channel 28 below the peripheral surface of the seat ring as supported by the lip member 27 provides a recess in which any particles of sediment may become harmlessly deposited without interfering with the seal between the parts which are intended to be maintained in pressure tight relationship. In replacing a seat ring such particles of sediment frequently tend to get lodged on the surfaces of the parts and if any such particles become so disposed as to interfere with the proper sealing of the back seal surface of the seat ring and the terminal seal surface presented by the portway gradual leaking inevitably results. By the provision of the channel 28 any particles of sediment or the like which otherwise might interfere with proper sealing tend to become lodged therein and when so lodged are entirely harmless and do not interfere with the obtainment of a pressure tight seal.

The seat ring 22 is maintained in position pressed against the surface 29 of the lip member 27 by novel means which, while simple, is such that ready removal of the seat ring is permitted and is such that a pressure tight seal can be afforded notwithstanding differences in the lateral position of the seat ring relative to the portway occasioned by wearing of the parts or even notwithstanding certain differences in the diameter of the seat ring when a new seat ring is of somewhat different diameter as compared with the seat ring which it replaces.

In the embodiment shown in Figs. 2 to 5 means for holding the periphery of the seat ring against the surface 29 of the lip member 27 in contact therewith is in the form of a screw 30 which is externally threaded for engagement with the internal threading of the lug 38 that is in rigid relationship with respect to the portway adjacent the periphery of the seat ring oppositely disposed to the lip member as by being integral with the valve body 10. The screw 30 is provided at its lower end with a part which is in the form of a conical tip 31. The inclination of the conical tip 31 is such that the conical tip establishes essentially line contact with the tapered peripheral surface 26 of the seat ring regardless of the rotational position of the screw 30. The upper end of the screw 30 is provided with a notch 32 for engagement with a screw driver or similar tool.

With the construction above mentioned it is apparent that all that is required to remove a seat ring and to replace a new one is to remove the bonnet 11 of the gate valve and then retract the screw 30 with an ordinary screw driver. When a new seat ring is replaced the screw 30 is then rotated in the opposite direction to bring the tip 31 into contact with the tapered peripheral surface 26 of the seat ring. By tightening the screw 30 firmly in place the seat ring is pressed against the surface 29 of the lip member in contact therewith so as in turn to press the annular back seal surface 23 of the seat ring into pressure tight relationship with the annular seal surface 21 presented by the portway. Moreover, the pressure of the tip 31 of the screw 30 against the tapered peripheral surface 26 of the seat ring also serves to press the annular back seal surface 23 of the seat ring against the annular terminal seal surface presented by the portway. Moreover, this pressure is preferably accomplished as shown by maintaining a line contact between the tip of the screw and the tapered periphery of the seat ring so as to give added strength and to provide a greater extent of surface contact.

By the means above described the annular back seal surface of the seat ring can be firmly brought into pressure tight relation with respect to the annular terminal seal surface presented by the portway. Moreover, it is apparent that such pressure tight relationship can be afforded by tightening down the screw 30 notwithstanding the fact that the surface 29 of the lip member 27 may become worn away as by frictional wearing or erosion during use either in the case of an old ring that is retained or in the case of a new seat ring that is substituted for an old one. It is also the case that even though the diameter of a replaced seat ring may not be identical with that of the old seat ring which is removed, the action of the screw 30 is such that the difference in spacing between the lug 38 which carries the screw in threaded engagement therewith and the periphery of the seat ring can be compensated for.

In the particular embodiment shown, the parts shown at the right hand in Figs. 2 and 3 are identical with the parts at the left hand portion of these figures except for their being arranged in complementary relationship thereto on the opposite side of the gate 18; and this being the case these parts are indicated by similar reference characters and no further description thereof is deemed to be necessary.

In Fig. 6 a modification is shown which corresponds to the parts shown in Figs. 2 and 4 except as regards the means for holding the seat ring in pressure contact with the surface of the lip member. Thus the typical valve body 10 is the same as shown in the preceding figures and the same is true with reference to the bonnet 11 and the collar 12 for holding the bonnet in position. The construction of the seat ring 22, of the portway 20, and of the lip member 27 is the same as shown and described in the preceding figures. However, in order to hold the seat ring 22 in pressure contact against the surface 29 of the lip member 27 with the annular back seal surface 23 of the seat ring in pressure contact with the annular terminal seal surface 21 of the portway modified means is employed whereby the pressure is resiliently maintained. In this embodiment the pin 33 is employed which has the conical tip part 34 for establishing line contact with the tapered peripheral surface 26 of the seat ring and which is slidably mounted in the lug 35 that is in rigid relation with respect to the portway. The cap member 36 is slidably fitted over the upper end of the pin 33 and a compression spring 37 is disposed between the end of the pin 33 and the closed end of the cap 36. The compression spring 37 is such that when the bonnet 11 is secured in place by the collar 12 the closed end of the cap member 36 is urged downwardly with resultant compression of the compression spring 37. In this way force is exerted on the pin 33 and by the tip 34 of the pin 33 on the tapered peripheral surface 26 of the seat ring with essentially the same effect as that above described when the screw member 30 shown in the preceding figures is tightened down so as to bring the tip 31 of the screw 30 in contact with the peripheral tapered surface 26 of the seat ring except that the pressure is resiliently applied. It is to be noted that in this embodiment, as well as that shown in Figs. 1 to 5, the means for pressing the seat ring against the lip member is such as to accommodate gradual wearing away of the parts or possible differences in diameter between different seat rings employed. When the embodiment shown in Fig. 6 is employed the seat ring can be readily removed inasmuch as when the bonnet 11 is removed the force exerted on the compression spring 37 is relieved and the cap member 36 is free to slide upwardly with reference to the pin 33. It is then a simple matter to either remove the pin 33 from the lug 35 or to merely retract it sufficiently to permit removal of the seat ring 22. As soon as a new seat ring has been installed then the parts are re-assembled and the pressure is applied to the seat ring for holding it in tightly sealed position as soon as the bonnet is secured in position by the collar 12 thereby compressing the spring 37.

In the practice of this invention the employment of holding means comprising a threaded member, such as the screw 30 shown in Figs. 2 to 5, and a part carried by the threaded member for pressure contact with the periphery of the seat ring exerted by the threaded member is preferred and has the advantage of positively maintaining the parts in pressure tight relation with no possibility of displacement in use. Moreover, a very high pressure may be applied to the parts to produce a tight seal because of the leverage afforded by the action of the threading. In the case of the embodiment shown in Fig. 6, on the other hand, the parts are self adjustable in accommodating wear between the contacting parts; and, for effecting this result, other resilient means than that shown for purposes of illustration may be employed for holding the seat ring in place. In either case, however, a tight seal can be afforded notwithstanding the fact that the surface of the contacting parts may have become worn away.

While this invention has been described in connection with certain specific constructions it is apparent that the specific constructions shown may be varied while employing the principles that have been described and illustrated hereinabove. The particular construction utilized will depend upon the type of device with which it is utilized. Thus while one type of gate valve has been shown for purposes of illustration, the invention can be employed in and adapted to other gate valve constructions. Moreover, devices other than gate valves may be improved according to this invention whenever it is desired to provide a portway and a removable seat ring therefor.

I claim:

1. A removable seat ring and portway combination for use in a gate valve or the like characterized by a portway presenting an annular terminal seal surface, a removable seat ring presenting an annular back seal surface adapted to abut said annular terminal seal surface presented by said portway in sealed relation thereto and peripherally presenting a frusto conical surface tapered inwardly extending forwardly from adjacent said annular back seal surface of said seat ring, a lip member in rigid relation to said portway and substantially spaced from said annular terminal seal surface presented by said portway to provide a channel of substantial width and of substantial depth between said lip member and said annular terminal seal surface presented by said portway, said lip member presenting an inwardly tapered surface adapted to abut a minor portion of the radial angular extent of said frusto conical surface of said seat ring essentially in alignment therewith, and a retractable screw in threaded engagement with a member in rigid relation to said portway and disposed oppositely to said lip member for adjustably urging said seat ring against said lip member and thereby forcing the annular back seal surface of said seat ring against the annular terminal seal surface presented by said portway, said screw presenting a conical tip adapted for making substantially a line contact with said frusto conical surface of said seat ring, and the peripheral surface of said seat ring being substantially spaced from the bottom of said channel.

2. In a removable seat ring and portway combination for use in a gate valve or the like comprising a portway presenting an annular terminal seal surface, a removable seat ring presenting an annular back seal surface adapted to abut said annular terminal seal surface presented by said portway, and holding means for holding said seat ring with said annular back seal surface thereof in substantial registration with said annular terminal seal surface presented by said portway, said holding means being characterized by a lip member rigid with said portway and adapted to contact periphery of said seat ring for supporting said seat ring with the annular back seal surface thereof in substantial registration with the annular terminal seal surface presented by said portway and with the periphery of said seat ring substantially spaced from the base of said lip member so that upon wearing away of the surface of said lip member in contact with the periphery of said seat ring substantial movement of said seat ring laterally with respect to said portway is permitted corresponding to the extent of such wearing away of said lip member, said lip member and the peripheral surface of said seat ring in contact therewith being adapted to urge said annular back seal surface of said seat ring for pressure contact with said annular terminal seal surface presented by said portway when said peripheral surface of said seat ring is pressed against the surface of said lip member in contact therewith, and means for pressing said peripheral surface of said seat ring against said surface of said lip member in contact therewith when said seat ring is in any of a plurality of positions relative to said portway as determined by the extent of any wearing away of said surface of said lip member.

3. In a removable seat ring and portway combination according to claim 2 wherein said means for pressing said peripheral surface of said seat ring against said lip member comprises a threaded member maintained in threaded engagement with a member in rigid relation to said portway and a part carried thereby adapted to establish pressure contact with periphery of said seat ring oppositely disposed to said lip member, said threaded member being rotatable in one direction to press said part carried thereby against the periphery of said seat ring for pressing the portion of the periphery of the seat ring in contact with said lip member against said lip member and being rotatable in the opposite direction for ready release of said seat ring and said part and the periphery of said seat ring in contact therewith being adapted to urge said back seal surface of said seat ring for pressure contact with said annular terminal seal surface member by said portway when said part is pressed against the periphery of said seat ring in contact therewith.

4. In a removable seat ring and portway combination according to claim 2 wherein said means for pressing said peripheral surface of said seat ring against said lip member comprises a part carried by a member in rigid relation to said portway for movement into and away from pressure contact with periphery of said seat ring oppositely disposed to said lip member for urging the portion of the periphery of said seat ring in contact with said lip member against said lip member, and means for resiliently pressing said part against periphery of said seat ring in contact therewith, said part and the periphery of said seat ring in contact therewith being adapted to urge said annular back seal surface of said seat ring for pressure contact with said annular terminal seal surface presented by said portway when said part is pressed against the periphery of said seat ring in contact therewith.

5. In a removable seat ring and portway combination for use in a gate valve or the like combination comprising a portway presenting an annular terminal seal surface, a removable seat ring presenting an annular back seal surface adapted to abut said annular terminal seal surface presented by said portway, and holding means for holding said seat ring with said annular back seal surface thereof in sealed registration with said annular terminal seal surface presented by said portway, said holding means being characterized by annular peripheral surface presented by said seat ring tapered inwardly extending forwardly from adjacent said annular back seal surface of said seat ring, lip means in rigid relation to said portway adapted to contact a substantial portion of the radial angular extent of said tapered peripheral surface of said seat ring and adapted to urge said annular back seal surface of said seat ring against said annular terminal seal surface presented by said portway when said tapered peripheral surface of said seat ring is pressed against said lip means, a threaded member in threaded engagement with a support member therefor in rigid relation with said portway and a part carried by said threaded member adapted to establish pressure contact with tapered periphery of said seat ring oppositely disposed to said lip means, said threaded member as carried in threaded engagement with said support member being rotatable in one direction to press said part carried thereby against the tapered periphery of said seat ring in contact therewith for pressing the portion of the tapered periphery of said seat ring in contact with said lip means against said lip means and for pressing the annular back seal surface of said seat ring against said annular terminal seal surface presented by said portway and being rotatable in the opposite direction for ready release of said seat ring.

6. In a removable seat ring and portway combination according to claim 5 wherein said lip means is of substantial height so that the surface of said lip means in contact with the periphery of said seat ring is substantially spaced from the base of said lip means and so that upon substantial wearing away of the surface of said lip means in contact with the peripheral surface of said seat ring corresponding lateral shifting of said seat ring relative to said portway is permitted.

7. In a removable seat ring and portway combination according to claim 5 wherein said part carried by said threaded member is in the form of a conical tip of said threaded member adapted to establish substantially line contact with the tapered peripheral surface of said seat ring in contact therewith.

8. In a removable seat ring and portway combination for use in a gate valve or the like combination comprising a portway presenting an annular terminal seal surface, a removable seat ring presenting an annular back seal surface adapted to abut said annular terminal seal surface presented by said portway, and holding means for holding said seat ring with said annular back seal surface thereof in sealed registration with said annular terminal seal surface presented by said portway, said holding means being characterized by annular peripheral surface presented by said seat ring tapered inwardly extending forwardly from adjacent said annular back seal surface of said seat ring, lip means in rigid relation to said portway adapted to contact a substantial portion of the radial angular extent of said tapered peripheral surface of said seat ring and adapted to urge said annular back seal surface of said seat ring against said annular terminal seal surface presented by said portway when said tapered peripheral surface of said seat ring is pressed against said lip means, a member rigidly mounted in relation to said portway adjacent the portion of periphery of said seat ring opposite to said lip means, a part movably mounted relative to said member for movement toward and away from contact with the tapered periphery of said seat ring and disposed for urging said seat ring toward said lip means, and means for maintaining said part in pressure contact with the tapered periphery of said seat ring when said part is in different positions of proximity to said member so that said pressure contact can be afforded when the portion of the tapered peripheral surface of the seat ring disposed for contact with said part is in different positions of proximity relative to said portway.

9. In combination with a portway presenting an annular terminal seal surface, a removable seat ring presenting an annular back seal surface abutting said annular terminal seal surface presented by said portway and presenting an annular tapered surface which tapers inwardly and forwardly from adjacent said back seal surface, a lip member in rigid relation to said portway and disposed in substantially spaced relation to said annular terminal seal surface presented by said portway, said lip member presenting a terminal surface tapered inwardly toward said annular seal surface presented by said portway and adapted to abut said annular tapered surface presented by said seat ring and presenting an inner surface of substantial lateral extent that is opposed to and substantially spaced from said terminal seal surface presented by said portway and provides a channel which is of substantial width between said lip member and said terminal seal surface of said portway and the bottom of which is substantially spaced from said tapered surface presented by said lip member and from the outer peripheral surface of said seat ring, a part in rigid relation to said portway and adjacent thereto in opposed relation to said lip member, a holding member presenting a holding surface and movably carried by said part for movement of said holding surface into and away from contact with a portion of said annular tapered surface presented by said seat ring opposed to the portion of said annular tapered surface presented by said seat ring in contact with said tapered surface presented by said lip member, and means for maintaining said holding surface of said holding member pressed against said tapered surface of said seat ring for pressing said seat ring between said holding surface of said member and said tapered surface presented by said lip member for thereby holding said seat ring in place with said annular back seal surface of said seat ring pressed against said annular seal surface presented by said portway.

References Cited in the file of this patent

UNITED STATES PATENTS

| Number | Name | Date |
| --- | --- | --- |
| 683,695 | Lundbom | Oct. 1, 1901 |
| 1,442,204 | Wilson | Jan. 16, 1923 |
| 2,431,268 | McIntyre | Nov. 18, 1947 |

FOREIGN PATENTS

| Number | Country | Date |
| --- | --- | --- |
| 41,008 | Netherlands | of 1937 |